US010713157B2

(12) United States Patent
Widder et al.

(10) Patent No.: US 10,713,157 B2
(45) Date of Patent: Jul. 14, 2020

(54) STORAGE SYSTEM AND METHOD FOR IMPROVING READ PERFORMANCE USING MULTIPLE COPIES OF A LOGICAL-TO-PHYSICAL ADDRESS TABLE

(71) Applicant: Western Digital Technologies, Inc., San Jose, CA (US)

(72) Inventors: Eyal Widder, Hod Hasharon (IL); Narendhiran Chinnaanangur Ravimohan, Bangalore (IN); Muralitharan Jayaraman, Bangalore (IN); Balakumar Rajendran, Tamil Nadu (IN); Indu Kumari, Haryana (IN); Abhinand Amarnath, Bangalore (IN); Rohit Sathyanarayan, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 34 days.

(21) Appl. No.: 15/994,524

(22) Filed: May 31, 2018

(65) Prior Publication Data

US 2019/0370167 A1 Dec. 5, 2019

(51) Int. Cl.

| | |
|---|---|
| ***G06F 12/02*** | (2006.01) |
| ***G06F 3/06*** | (2006.01) |
| ***G06F 12/0884*** | (2016.01) |

(52) U.S. Cl.

CPC .......... *G06F 12/0246* (2013.01); *G06F 3/061* (2013.01); *G06F 3/0659* (2013.01); *G06F 3/0679* (2013.01); *G06F 12/0292* (2013.01); *G06F 12/0884* (2013.01); *G06F 2212/7201* (2013.01)

(58) Field of Classification Search

CPC ......... G06F 12/0292; G06F 12/10–109; G06F 2212/65–657; G06F 2212/7201; G06F 12/00–16

See application file for complete search history.

(56) References Cited

U.S. PATENT DOCUMENTS

| | | | | |
|---|---|---|---|---|
| 9,448,919 B1 * | 9/2016 | Boyle | ..................... | G06F 12/02 |
| 2017/0262192 A1 * | 9/2017 | Aga | ..................... | G06F 3/0611 |

* cited by examiner

*Primary Examiner* — Nicholas J Simonetti

(74) *Attorney, Agent, or Firm* — Dickinson Wright PLLC; Steven Hurles

(57) ABSTRACT

A storage system and method for improving read performance using multiple copies of a logical-to-physical address table are provided. In one embodiment, a method for parallelism is provided that is performed in a storage system comprising a plurality of memory areas accessible in parallel, wherein each memory area stores a copy of a logical-to-physical address table. The method comprises reading portions of the logical-to-physical address tables in parallel from the plurality of memory areas, wherein the portions comprise translations for logical addresses associated with a plurality of memory commands; translating the logical addresses associated with the plurality of memory commands into physical addresses using the read portions; and performing the plurality of memory commands. Other embodiments are provided.

20 Claims, 13 Drawing Sheets

| Die O | |
| --- | --- |
| **Plane 0** | **Plane 1** |
| GAT page 0 primary copy | GAT page 0 secondary copy |
| GAT page 1 primary copy | GAT page 1 secondary copy |
| GAT page 2 primary copy | GAT page 2 secondary copy |
| ... | |
| | |
| | |
| GAT page n primary copy | GAT page n secondary copy |

STORAGE SYSTEM AND METHOD FOR IMPROVING READ PERFORMANCE USING MULTIPLE COPIES OF A LOGICAL-TO-PHYSICAL ADDRESS TABLE

BACKGROUND

Storage systems typically use a logical-to-physical address table to translate a logical address associated with a memory operation (e.g., a read or write command) into a physical address of a memory location. In operation, the logical-to-physical address table can be stored in non-volatile memory to preserve its data in the event of a power loss. The storage system can cache the logical-to-physical address table into volatile memory before it uses the logical-to-physical address table for address translation. In storage systems with a relative-large amount of memory locations (e.g., in storage systems with a plurality of memory dies), the entire logical-to-physical address table may be too large to fit in volatile memory. In such a situation, a portion of the logical-to-physical address table can be cached in volatile memory.

BRIEF DESCRIPTION OF THE DRAWINGS

FIG. 9 is an illustration of a memory die of an embodiment in which copies of a logical-to-physical address table are stored in two planes of the memory die.

DETAILED DESCRIPTION

Overview

Figure 1A:
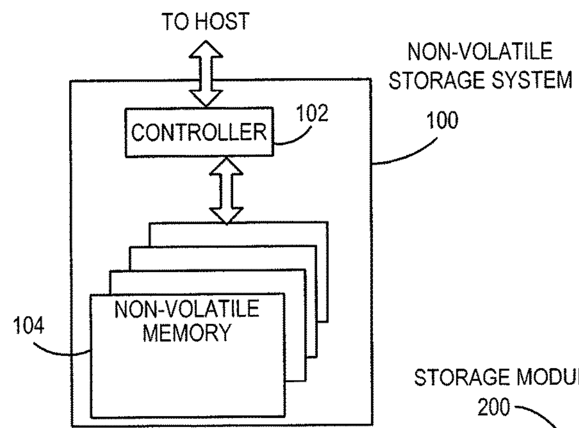
FIG. 1A is a block diagram of a non-volatile storage system of an embodiment.

By way of introduction, the below embodiments relate to a storage system and method for improving read performance using multiple copies of a logical-to-physical address table. In one embodiment, a method for parallelism is provided that is performed in a storage system comprising a plurality of memory areas accessible in parallel, wherein each memory area stores a copy of a logical-to-physical address table. The method comprises reading portions of the logical-to-physical address tables in parallel from the plurality of memory areas, wherein the portions comprise translations for logical addresses associated with a plurality of memory commands; translating the logical addresses associated with the plurality of memory commands into physical addresses using the read portions; and performing the plurality of memory commands.

In some embodiments, all of the portions of the logical-to-physical address tables are read before any of the memory commands are performed.

In some embodiments, at least some of the plurality of memory commands are performed in parallel.

In some embodiments, the plurality of memory commands comprise at least one of a read command and a write command.

In some embodiments, at least one of the plurality of memory commands comprises a write command, wherein performing the write command results in a change to one of the logical-to-physical address tables, and wherein the method further comprises marking the logical-to-physical address tables that have not been changed as obsolete.

In some embodiments, the method further comprising updating the logical-to-physical address tables marked as obsolete per the change made to the one of the logical-to-physical address tables.

In some embodiments, each copy of the logical-to-physical address table is identified by a respective sequence number, wherein the markings as to which logical-to-physical address tables are obsolete are erased during a power loss, and wherein the method further comprises, after the power loss, identifying which logical-to-physical address tables are obsolete based on which logical-to-physical address tables have a sequence number lower than a highest sequence number among all the logical-to-physical address tables.

In some embodiments, the storage system comprises a three-dimensional memory.

In some embodiments, the plurality of memory areas comprise a plurality of memory dies.

In some embodiments, the plurality of memory areas comprise a plurality of planes in a memory die.

In another embodiment, a method for parallelism is provided that is performed in a storage system comprising a plurality of memory areas accessible in parallel, wherein each memory area stores a copy of a logical-to-physical address table. The method comprises identifying a first memory area associated with a first memory operation; identifying a second memory area from which to read the logical-to-physical address table to translate a logical address associated with a second memory operation; and performing the first memory operation in the first memory area in parallel with reading the logical-to-physical address table from the second memory area.

In some embodiments, the memory operation comprises one of a read command and a write command.

In some embodiments, the plurality of memory areas comprise a plurality of memory dies.

In some embodiments, the plurality of memory areas comprise a plurality of planes in a memory die.

In some embodiments, the storage system comprises a three-dimensional memory.

In another embodiment, a storage system is provided comprising a memory comprising a plurality of memory areas accessible in parallel, each memory area storing a copy of a table; and at least one of the following: means for reading the tables from the plurality of memory areas in parallel prior to performing a memory operation in one of the plurality of memory areas so that reading the tables does not prevent the memory operation from being performed in the one of the plurality of memory areas; and means for determining which memory area to read the table from so that the table is read in parallel with a memory operation being performing in another one of the memory areas.

In some embodiments, the table comprises a logical-to-physical address table.

In some embodiments, the memory comprises a three-dimensional memory.

In some embodiments, the storage system is embedded in a host.

In some embodiments, the storage system is removably connectable from a host.

Other embodiments are possible, and each of the embodiments can be used alone or together in combination. Accordingly, various embodiments will now be described with reference to the attached drawings.

Embodiments

Figure 1B:
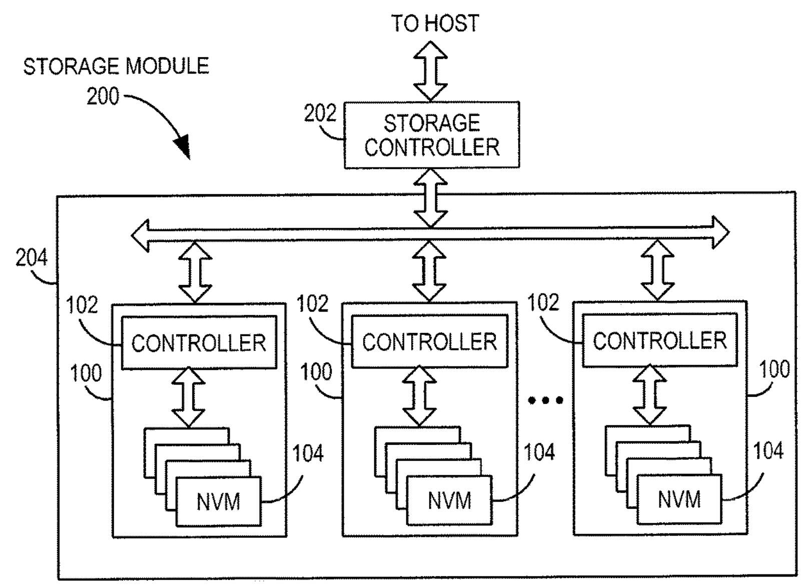
FIG. 1B is a block diagram illustrating a storage module of an embodiment.
Figure 1C:
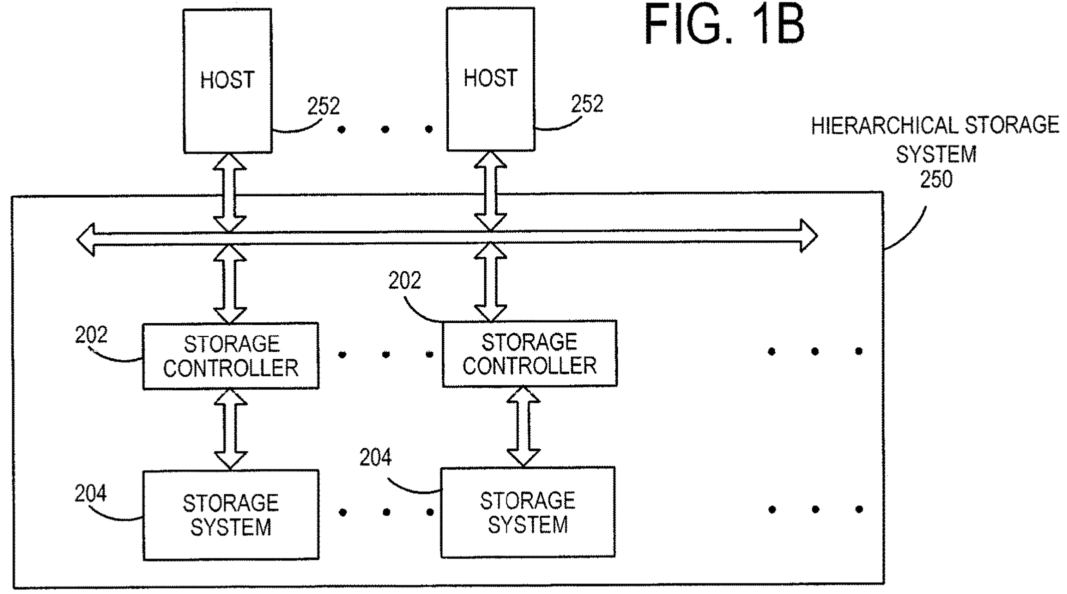
FIG. 1C is a block diagram illustrating a hierarchical storage system of an embodiment.

Storage systems suitable for use in implementing aspects of these embodiments are shown in FIGS. 1A-1C. FIG. 1A is a block diagram illustrating a non-volatile storage system 100 according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, Re-RAM, PCM, or MRAM controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card based system, such as a secure digital (SD) or a micro secure digital (micro-SD) card. In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interface express (PCIe) interface, or dual-date-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be an NVMe or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
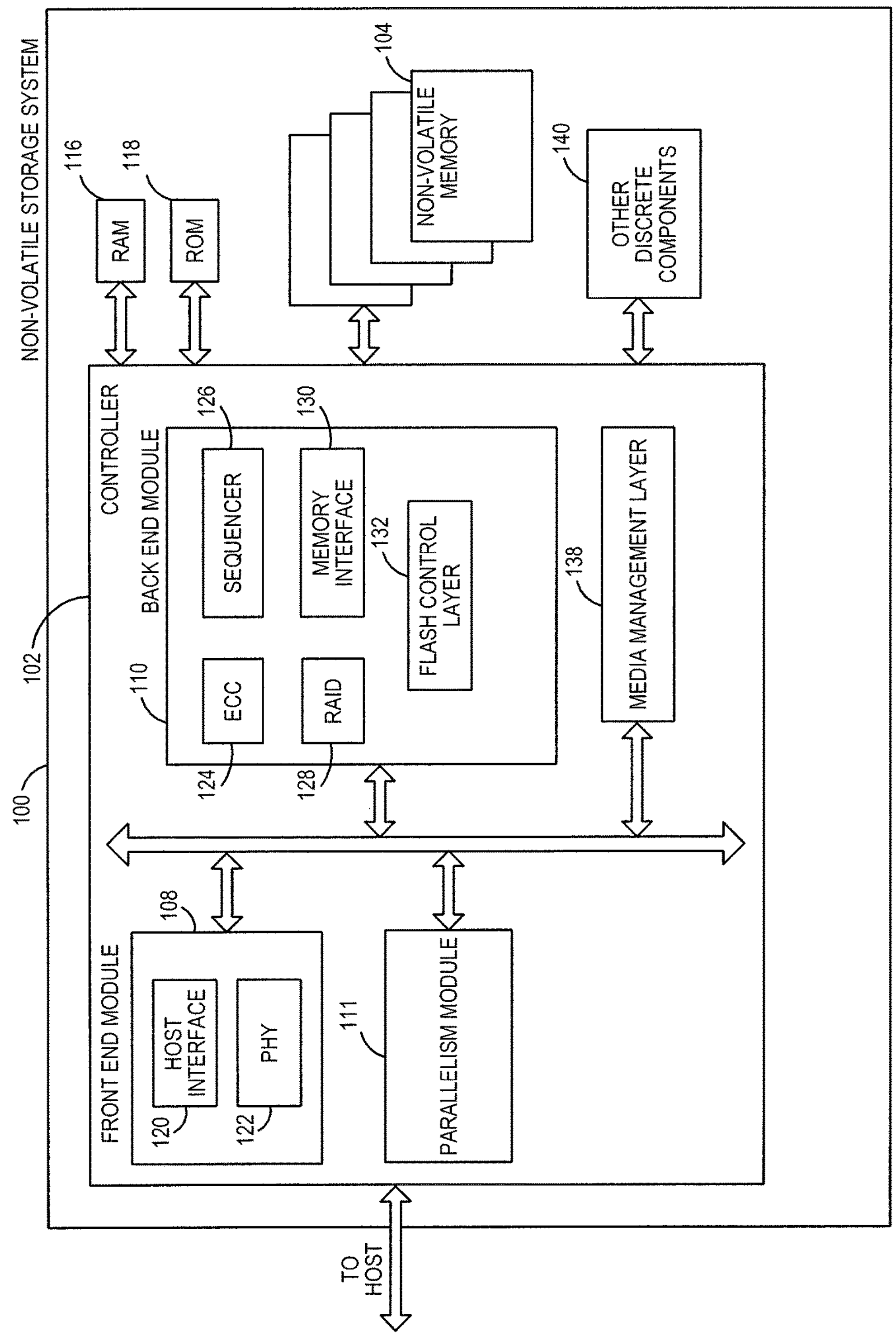
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Modules of the controller 102 may include a parallelism module 111, which will be discussed in more detail below and can be implemented in hardware or software/firmware to perform the algorithms and methods discussed herein and shown in the attached drawings.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, SAS, Fibre Channel, USB, PCIe, and NVMe. The host interface 120 typically facilitates transfer for data, control signals, and timing signals.

Back end module 110 includes an error correction controller (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, One or more of the physical layer interface 122, RAID module 128, media management layer 138 and buffer management/bus controller 114 are optional components that are not necessary in the controller 102.

Figure 2B:
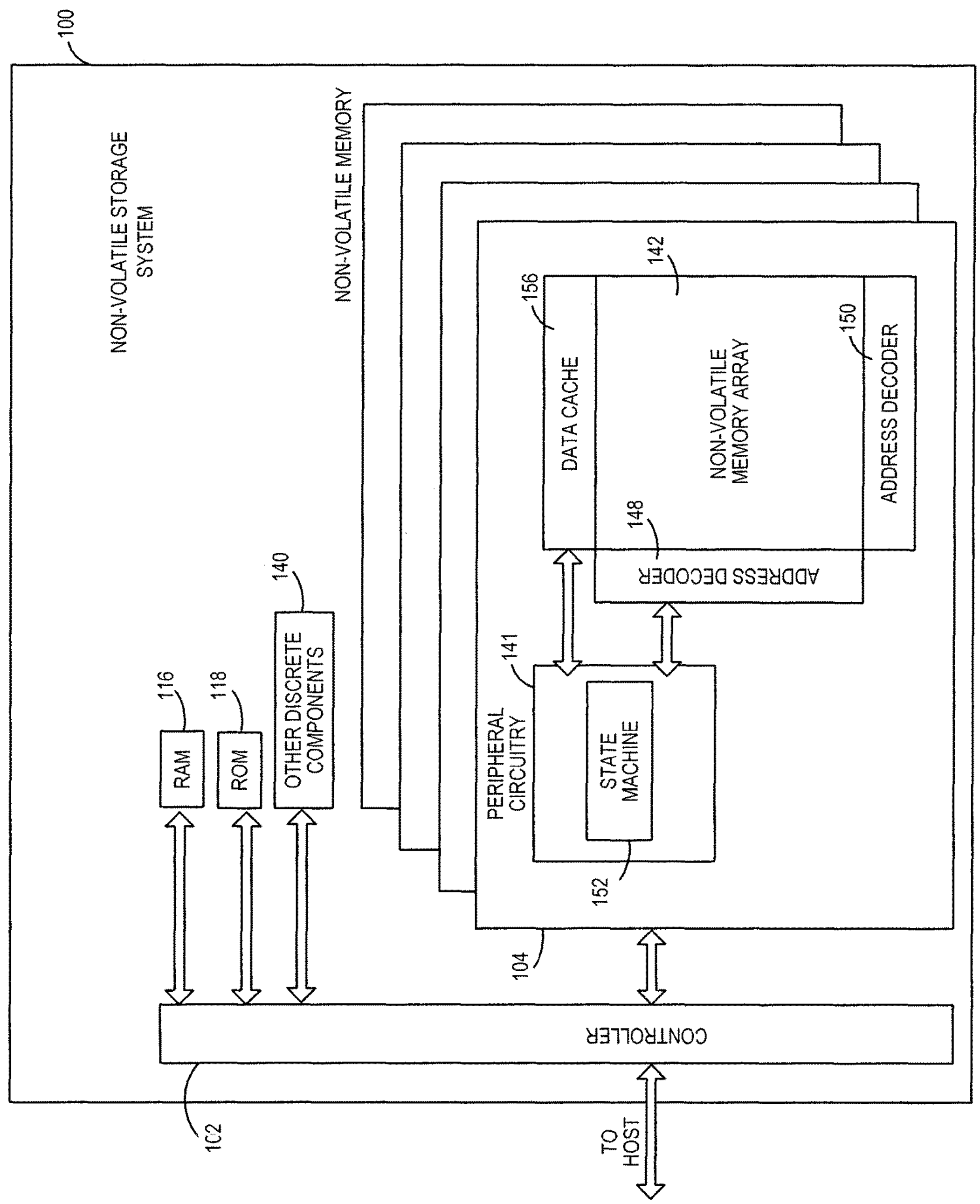
FIG. 2B is a block diagram illustrating components of the non-volatile storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two dimensional and/or three dimensional configuration. Non-volatile memory die 104 further includes a data cache 156 that caches data. Peripheral circuitry 141 includes a state machine 152 that provides status information to the controller 102.

As noted above, storage systems typically use a logical-to-physical address table to translate a logical address associated with a memory operation (e.g., a read or write command) into a physical address of a memory location. As used herein, the terms "table" and "map" will be used interchangeably. Also, a logical-to-physical address table is an example of a management table that includes internal metadata, and these embodiments can be used with other types of management tables, including, but not limited to, a table mapping physical blocks to a validity bit. Logical-to-physical address tables will be used to illustrate the below embodiments; again, other types of management tables can be used.

Logical-to-physical address tables are typically stored in the same non-volatile memory together with user and host data. In a page-based storage system, the minimal mapping unit (i.e., the page size) may be very small. In reverse proportion to the page size, the logical-to-physical address tables can grow in size and become difficult to store in the system's volatile memory (e.g., SRAM). Therefore, non-volatile random page access in the volatile memory in an SRAM-constrained storage system may require the system to read the logical-to-physical address table from the non-volatile memory (to cache it in the system's volatile memory) as a prior step to the actual data page read.

In a multiple-die stack system, performance improves significantly because of operating the multiple dies in parallel for both read and write operations. However, a host request to read or write data typically requires accessing a management table that is stored in an arbitrary die prior to accessing the actual data in order to get the physical addresses translated from logical addresses.

Hence, even when the host data is evenly spread over all dies to improve access throughput, getting the management data may cause pipe delays due to accessing the same die sequentially, getting first the access information from the stored management table, and next accessing the correct physical address accordingly, which reduces access parallelism and performance. Management tables may be spread over the dies, but delays still may happen arbitrarily in the pipe line due to sequential accesses and especially in a system with a command queue, where the order of command execution may be arbitrary. Further, firmware in a controller in such a system can be configured to order commands in sequences such that information fetched from a management table can be read, inferred, and then used for next accesses. This solution can add a delay and may stall pipeline operations of multi-die systems. Moreover, this solution may not be fully optimized in a system that provides a command queue and an out-of-order command execution such as Non-Volatile Memory Express (NVMe) systems, for example.

Figure 3:
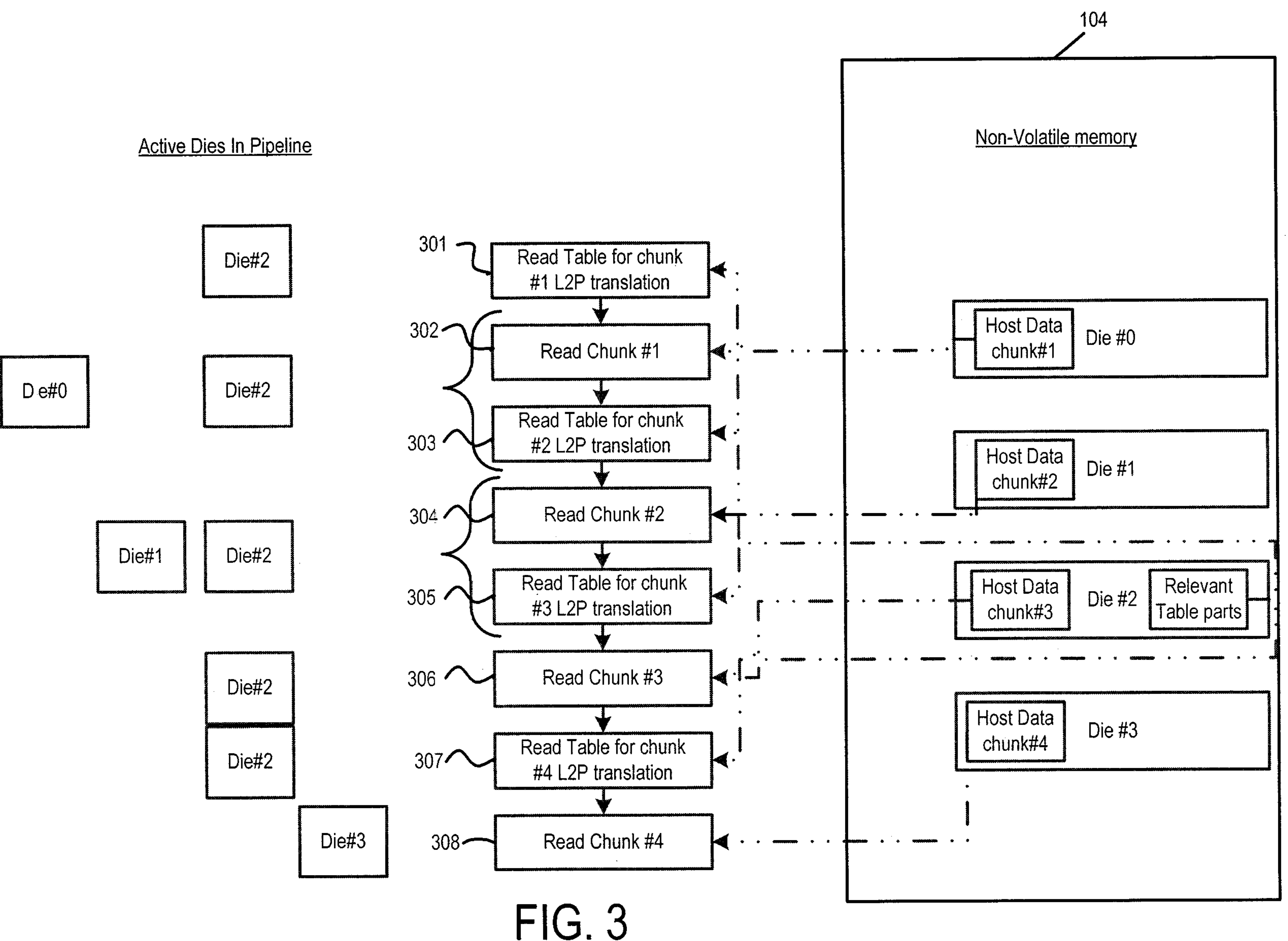
FIG. 3 is an illustration of a multi-die system of an embodiment in which accesses are performed sequentially since the physical addresses are not known in advance and need to be read from the same memory die.

FIG. 3 illustrates this problem. FIG. 3 shows the number of active dies in a pipeline during a random access to the non-volatile memory 104. In this example, the host has four data "chunks" (i.e., data segments) to read, and they are spread over the four physical dies in the memory 104. Further, in this example, all relevant parts of the logical-to-physical address table are in Die #2.

In this example, the host sent read commands for four data chunks (these commands can be stored in a command queue in the storage system 100 and sequenced by the controller 102), each command being associated with a respective logical address. As shown in the flow chart in FIG. 3, first, the controller 102 reads the relevant table in Die #2 for translating the logical address for Chunk #1, stores it in volatile memory (e.g., RAM 116), and then translates the logical address (act 301). Accordingly, FIG. 3 shows that only Die #2 is active at this stage in the pipeline. The logical address for Chunk #1 translates to a physical address in Die #0. So, the controller 102 reads Chunk #1 from Die #0 (act 302). To take advantage of die parallelism, the controller 102 reads the relevant table in Die #2 for translating the logical address for the next command (to read Chunk #2), stores it in volatile memory, and then translates the logical address (act 303). Accordingly, FIG. 3 shows that Dies #0 and #2 are active at this stage in the pipeline. The process continues in this fashion for the remainder of the steps (act 304-308).

As shown in this example, in instances where the chunk to be read is stored in a die other than the die that stores the logical-to-physical address table part for the next command (Die #2), the storage system achieves die parallelism. However, when the chunk to be read is stored in Die #2, parallelism is not achieved, and Die #2 is accessed in series. Accordingly, as shown by this example, random execution of commands from a command queue that may need to access the management table first cannot be optimized by the controller's firmware and may cause pipeline stalls.

The following embodiment recognizes that, by duplicating the management tables to multiple dies, metadata of next commands may be extracted in advanced from free-to-access dies, allowing full parallelism to be achieved. In general, the controller 102 in this embodiment can be configured with multi-die command execution scheduler firmware (e.g., the parallelism module 111). This firmware can be configured to create and manage a plurality of management table copies in multiple physical dies, fetch commands out-of-order (000) from one or more submission command queues according to a heuristic, access management table copies in parallel to performing read/write operations utilizing the multi die system more efficiently, and optimize the parallel execution of commands by the multi-die system. As will be discussed in more detail below, performing read operations of management data in parallel to reading or writing user data from other dies can significantly improve the parallel performance of multi-die storage systems and, hence, user experience.

As mentioned above, in this embodiment, copies of the logical-to-physical address table are stored in a plurality of memory dies. There can be a one-to-one relationship between the number of memory dies and the number of copies (i.e., every memory die in the system stores a copy of the table), or a subset of two or more memory dies (but less than all of the dies) can store the copies. Also, as used herein, "copy" can refer to either a copy of the original or (more generally) to an instance of the table. For example, if there is an original table and three copies made of that table, it can be stated either that there is an original and three copies, or that there are a total of four copies of the table. Also, since the management tables may be large and grow with a proportion to the storage capacity, or may be partially unused (e.g., when the storage is not fully utilized), it may be desirable to copy only the accessed table pages and utilize a caching technique that will still create a benefit with a reduced operational latency and controllable footprint in the non-volatile memory. Accordingly, as used herein, the term "table" can refer to either the entire table or a portion of the table.

Figure 4:
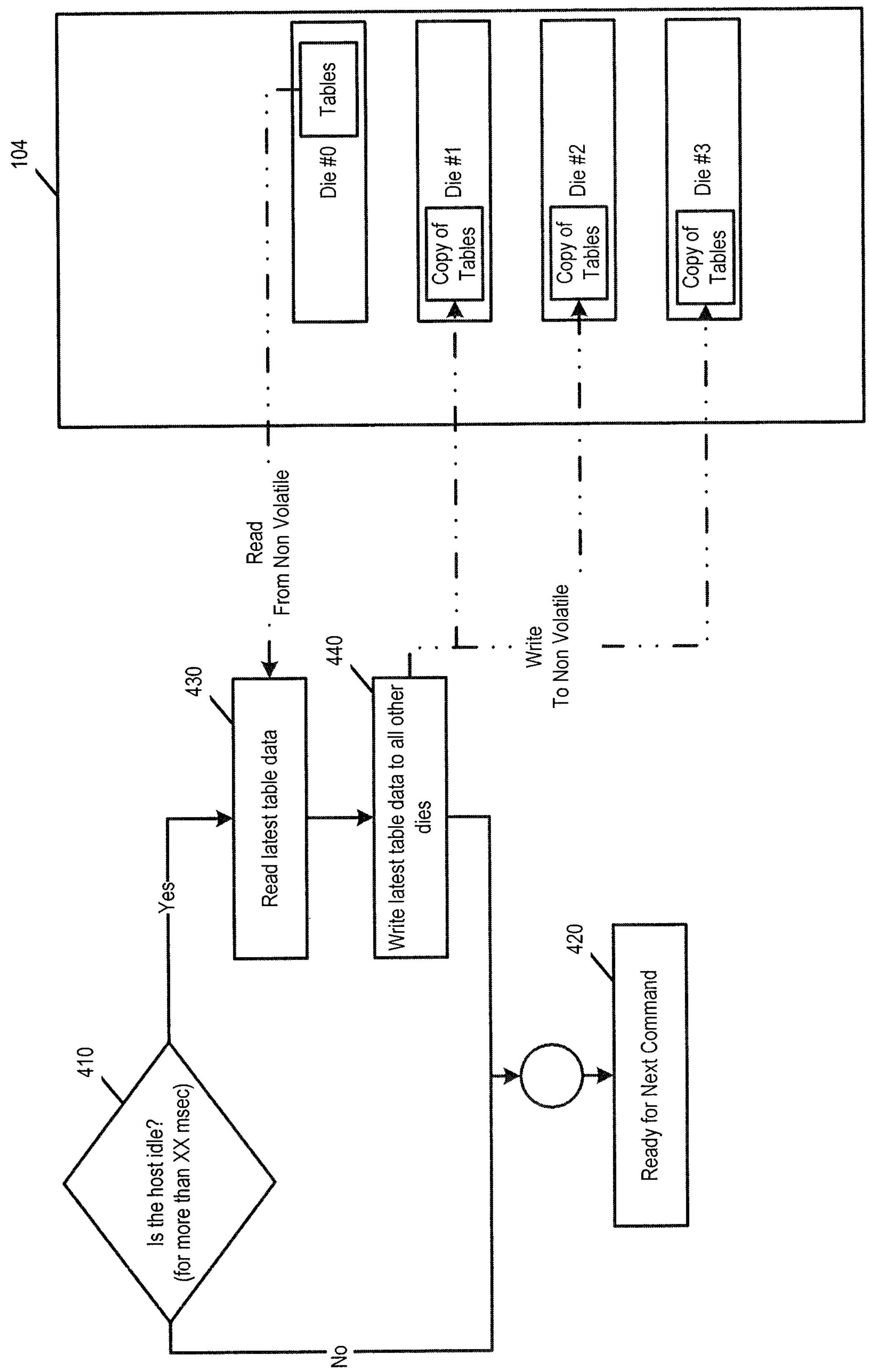
FIG. 4 is an illustration of a multi-die system of an embodiment in which a management table from Die #0 is read to obtain the physical addresses and write operations to Die #1, Die #2, and Die #3 are performed in parallel.

The copies of the table can be stored in the memory dies in any suitable manner. For example, in one embodiment, shown in FIG. 4, the storage system 100 uses device idle time to create and manage copies of the management table over multiple physical dies (e.g., as a background operation). As shown in FIG. 4, the controller 102 of the storage system 100 can determine if the host is idle (e.g., if there has been no activity on the bus for more than XX msec) (act 410). If the host is not idle, the controller 102 is ready for the next command (act 420). However, if the host is idle, the controller 102 can read the latest table data (act 430). In this example, the latest table data is stored in Die #0 in the memory 104. Next, the controller 102 writes the latest table data to all of the other dies in the system 100 (here, Dies #1, #2, and #3) (act 440).

Figure 5:
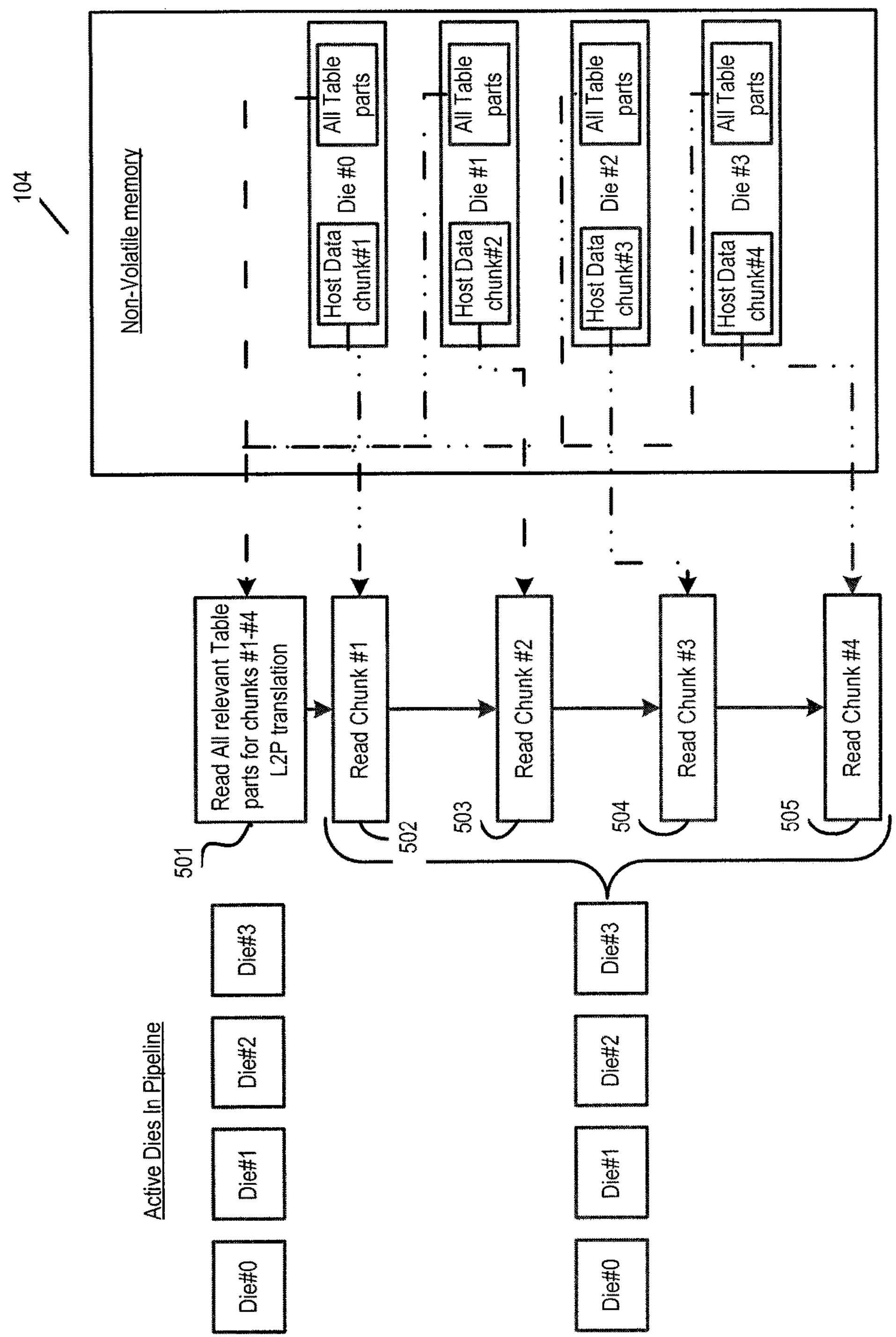
FIG. 5 is an illustration of a multi-die system of an embodiment in which parallel operations are performed accessing more dies in parallel using copies of the management table stored in all dies.

As a result, all of the memory dies in the memory 104 store the same instance of the table data. Accordingly, the table can be read from any of the memory dies. In this way, prior or during host read or write sequences, the controller 102 can read the table from any available free die, thereby improving system pipeline performance over systems that store the table in only one die and need to wait for that one die to become free to read the table. FIG. 5 illustrate this improvement.

As shown in FIG. 5, each of the memory dies store all of the table parts (in contrast to the example shown in FIG. 3 where only one die stored the relevant table parts). In this example, the storage system 100 receives a plurality of memory commands (e.g., read and/or write commands) from a host and stores them in a command queue. Before any of these memory commands are performed, the storage system 100 reads the relevant portions of the logical-to-physical address tables for the memory commands in parallel from the plurality of memory dies (act 501). In this way, all four memory dies are active in the pipeline at this stage, and the storage system 100 gets the reading of the table portions out of the way before any commands are executed. After the relevant table portions are read and the logical addresses are translated, each of the data chunks can be read in parallel when the memory commands are performed (acts 503, 504, and 505), with all dies being used in parallel. This avoids the problem encountered in the example of FIG. 3, where die parallelism for the memory commands was not achievable when the table needed to be read from one of the dies during the performance of the memory commands. So, the embodiment of FIG. 5 takes two steps to complete, while the embodiment of FIG. 3 takes five steps. Of course, it is possible that all four dies may not be able to be read in parallel if two or more of the data chucks are stored in the same die. So, depending on where the data is stored, all of the memory commands can be performed in parallel, some (but not all) of the memory commands can be performed in parallel, or none of the memory commands can be performed in parallel. However, reading the table data is not an impediment to parallelism in this embodiment (unlike the example in FIG. 3).

It should be noted that while there was a one-to-one correspondence between the number of commands and number of dies in this example, other arrangements are possible. The general idea is that the table parts are read in parallel is some fashion (be it in two dies, three dies, or four dies) rather than serially. It is this parallel reading of the table data that eliminates or reduces the possibility that reading the table data will prevent parallel data reads.

Figure 6:
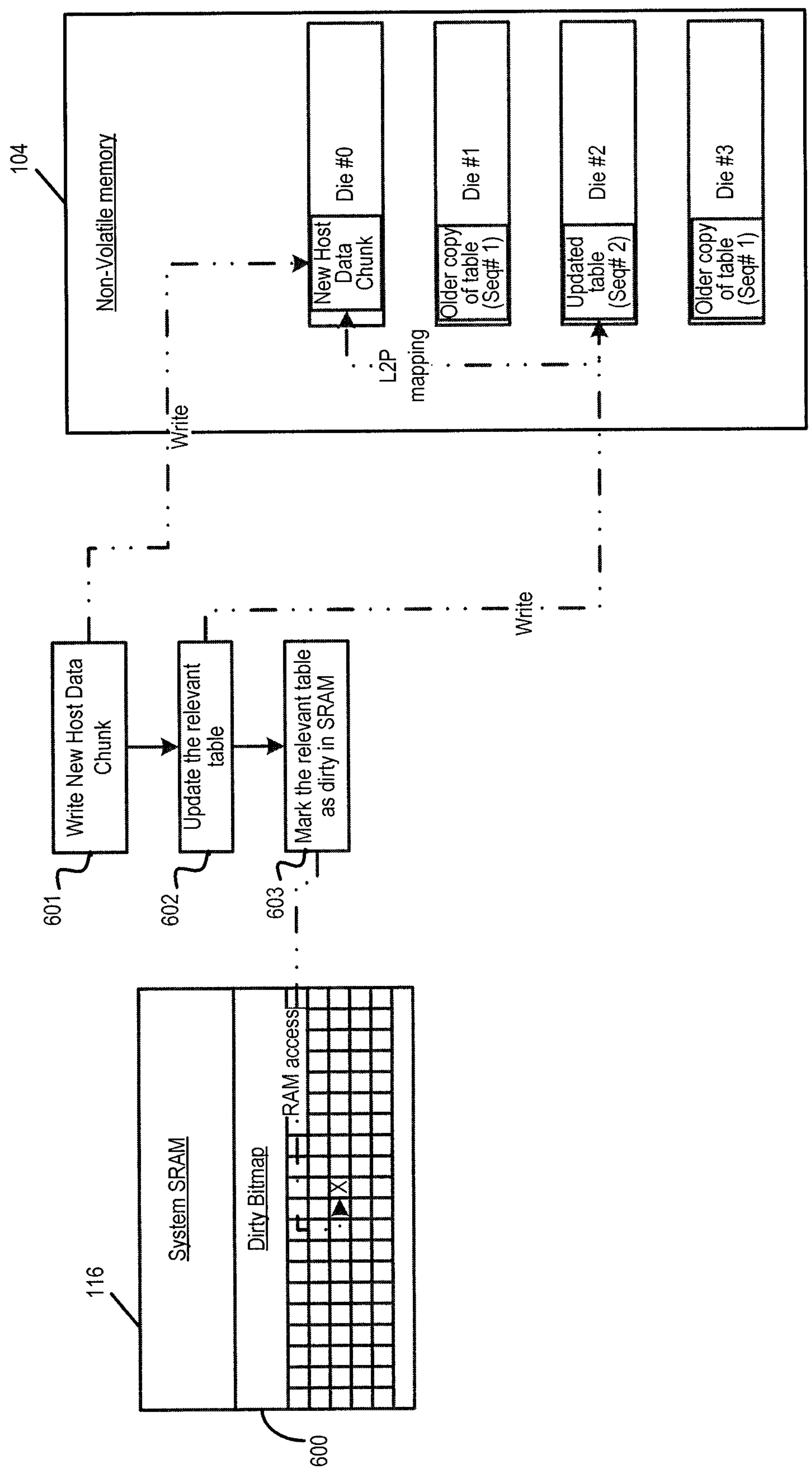
FIG. 6 is an illustration of a multi-die system of an embodiment during a write operation, in which tables could be updated and, therefore, create "dirty" (obsolete) copies in non-volatile memory.

It should be noted that, during read operations, since there is no change done to the management tables, there is no problem in using copies of the management tables to improve performance. However, a write operation can result in a change to one of the stored instances of the table, rendering the instances in the other dies obsolete ("dirty"). FIG. 6 illustrates an embodiment that addresses this problem. In general, when performing a write command results in a change to one of the logical-to-physical address tables, the controller 102 can mark the logical-to-physical address tables that have not been changed as obsolete. These "dirty flags" can be in granularity of basic units (e.g., for large table parts) to reduce impact on performance when re-syncing of the tables is eventually performed.

As shown in FIG. 6, when the controller 102 writes new host data, the controller 102 updates one of the logical-to-physical address tables in the memory 104 (here, in Die #0) (acts 601 and 602). Then, the controller 102 marks the other tables as "dirty" in a dirty bitmap 600 in the volatile memory 116 (act 603). That way, the controller 102 will later know which stored table(s) contain up-to-date information and which one(s) do not. The controller 102 can later update the logical-to-physical address tables marked as obsolete per the change made to the "non-dirty" one.

Figure 7:
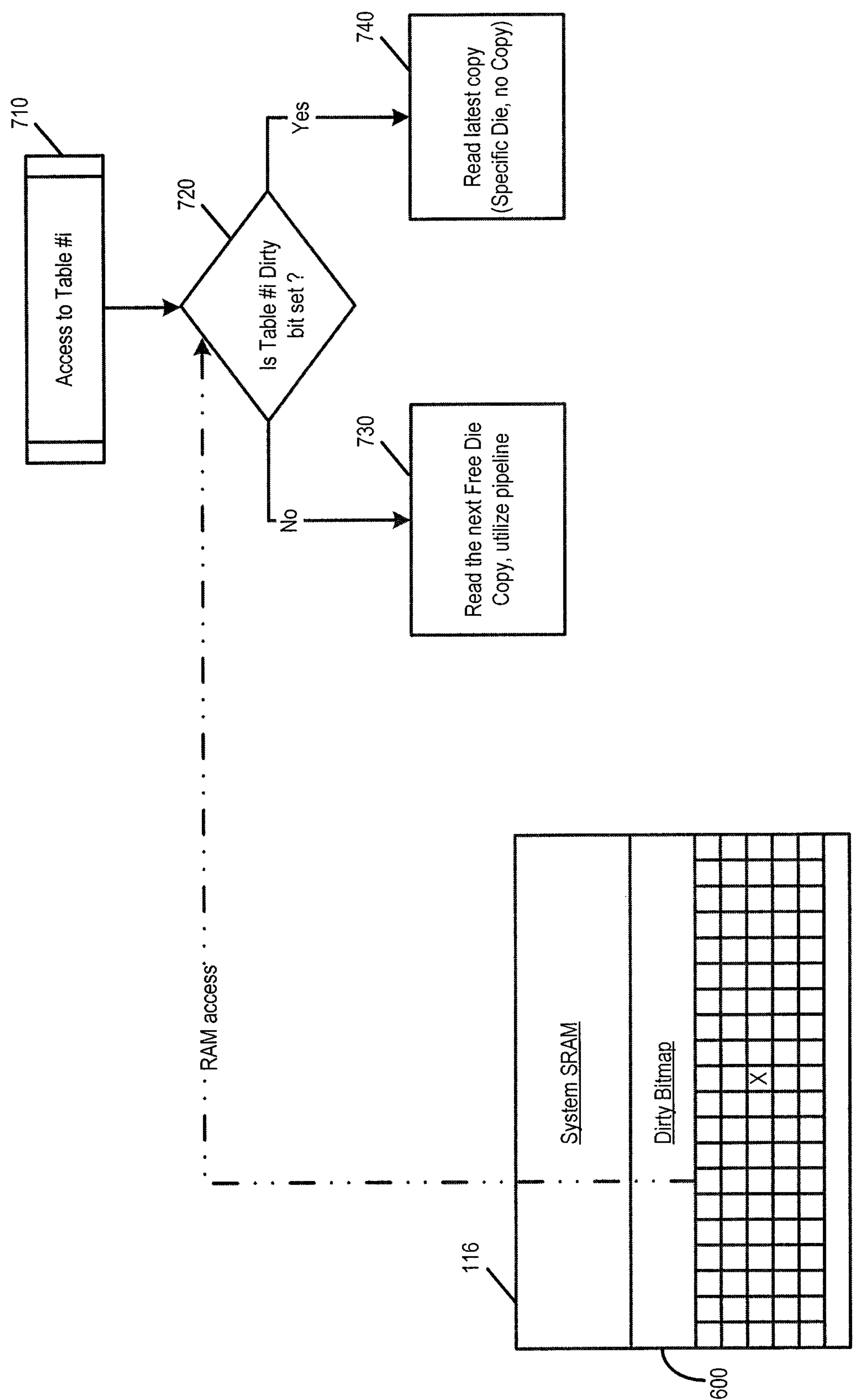
FIG. 7 is an illustration of a multi-die system of an embodiment using "dirty" flags before a table read.

FIG. 7 illustrates the use of the "dirty" flags before a table read. As shown in FIG. 7, when the controller 102 accesses Table #i (act 710), the controller 102 determines if the "dirty" bit was set in the table (act 720). If the "dirty" bit was not set, the table is valid, and the controller 102 can read the next free die copy, utilizing the pipeline (act 730). However, if the "dirty" bit was set, the table is obsolete, and the controller 102 reads the latest copy of the table in a specific die instead of reading an obsolete copy (act 740).

Since the volatile memory does not retain data in the absence of power, the dirty bitmap 600 is subject to a power loss. To address this issue, a sequence meta-data number (e.g., a sequence number) can be added to tables written to the non-volatile memory dies and volatile "dirty" flags. With each copy of the logical-to-physical address table identified by a respective sequence number, after a power loss occurs (erasing the "dirty" flags in the obsolete tables), the controller 102 can identify which logical-to-physical address tables are obsolete based on which logical-to-physical address tables have a sequence number lower than a highest sequence number among all the logical-to-physical address tables. This embodiment is illustrated in FIG. 8.

Figure 8:
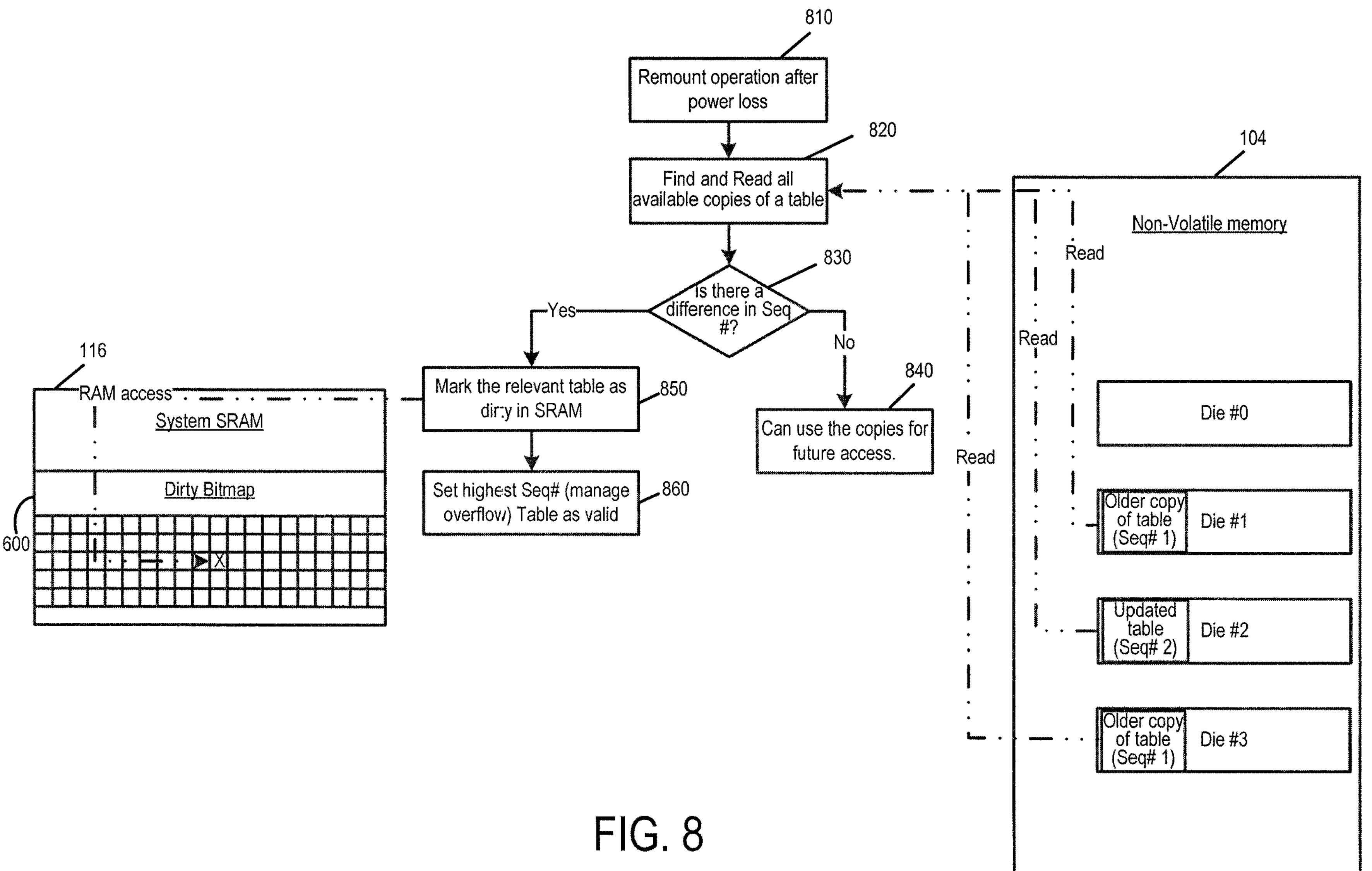
FIG. 8 is an illustration of a multi-die system of an embodiment that is resilient to power losses and can identify obsolete copies of a management table.

As shown in FIG. 8, the controller 102 conducts a remount operation after power loss (act 810). In this operation, the controller 102 finds and reads all available copies of the logical-to-physical address table in the memory dies (act 820). The controller 102 then determines if there is a difference in the sequence numbers in the tables (act 830). If there isn't a difference, that means all tables are current, and the controller 102 can use any/all of the tables (act 840). However, if there is a difference, that means that one of the tables is current, and the others are obsolete. So, the controller 102 marks the lowest-sequence-number tables as obsolete (act 850) and sets the highest-sequence-number table as valid (act 860).

There are many alternatives that can be used with these embodiments. For example, in the above illustrations, parallelism was achieved across a plurality of memory dies. However, in other embodiments, parallelism can be achieved across memory areas other than a memory die, such as a plurality of planes in a single memory die. Accordingly, the term "memory area" is used herein to refer to any memory area that can be accessed in parallel, be it a memory die, a memory plane, or some other area of memory (different types of memory areas may have different requirements and restrictions on being accessed in parallel). The following additional embodiments will be discussed in terms of a memory plane (but, again, a memory die or other parallel memory area can be used).

As mentioned above, random read performance is tightly coupled with the random read range over which the read requests can come because of the need for logical-to-physical address conversion at the controller 102. In some embodiments, this logical-to-physical address conversion information is present in a firmware structure called a global address table (GAT) (generally referred to herein as a logical-to-physical address table or map). In one embodiment, every 4 KB logical chunk size is represented by 4 bytes of information in GAT.

In low-cost controllers with relatively-small volatile memory (e.g., RAM), the GAT is fetched from the non-volatile memory (e.g., NAND) into volatile memory frequently even for a small random read range because the number of GAT pages that can be cached in volatile memory is limited. Even in controllers with more volatile memory, applications with a bigger random read range can suffer. This embodiment can be used to minimize the GAT read overheads from the non-volatile memory 104 to the controller 102, thus improving random read performance without increasing controller cost (unlike solutions that increase controller volatile memory to accommodate more GAT pages for bigger random read range applications) and without significantly increasing write amplification and write performance (unlike solutions that increase logical group size so that less GAT storage can contain information about more logical addresses).

In general, in this embodiment, a plurality of memory planes in a memory die each store a copy of the logical-to-physical address table. In this way, if one memory plane is occupied performing an operation, another memory plane can be accessed to read the logical-to-physical address table. That is, the controller 102 can determine which memory plane to read the table from so that the table is read in parallel with a memory operation being performing in another plane. In one embodiment, the controller 102 identifies a first memory plane associated with a first memory operation, identifies a second memory plane from which to read the logical-to-physical address table to translate a logical address associated with a second memory operation, and perform the first memory operation in the first memory plane in parallel with reading the logical-to-physical address table from the second memory plane. This provides a level of parallelism that is prevented if only one copy of the table is stored. That is, the controller 102 writes two or more copies of the logical-to-physical address table, and, during read, the logical-to-physical address table is read in parallel to the host read from the other plane (or die), so that plane interleave (or die interleave) can be utilized to eliminate the logical-to-physical address table sense overhead. FIG. 9-12 illustrate this embodiment.

As shown in FIG. 9, the logical-to-physical address table is stored as two copies: here, in plane 0 and plane 1 in a single die (alternatively, as mentioned above, the copies can be stored in different dies). The write performance is not impacted because the logical-to-physical address table is usually written to non-volatile memory in a one-plane mode, and plane interleave or die interleave is not used. In this method, interleave can be used for programming the two copies, thus not impacting write performance. (However, in some embodiments, write amplification on blocks storing the logical-to-physical address tables is increased, and, hence, requires double the block allocation.)

Figure 10:
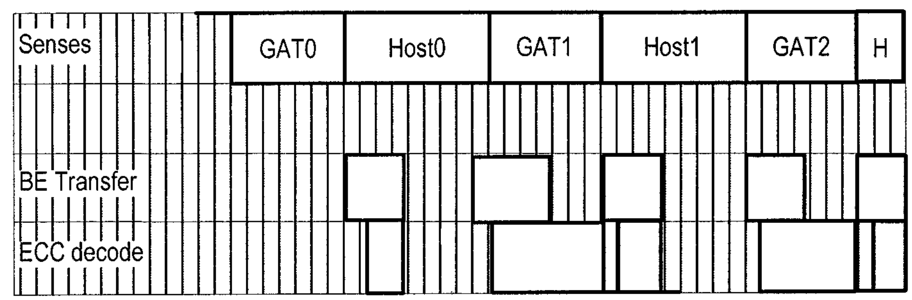
FIG. 10 is a timing diagram of an embodiment in which a single copy of a logical-to-physical address table is used.

If reading the logical-to-physical address table is done without utilizing the interleave mode, the storage system 100 cannot guarantee that the commands that are queued up by the host have the logical-to-physical address tables in different planes to utilize the interleave. In a pure random scenario, 50% of the scenarios can utilize interleave, and the remaining 50% cannot (meaning that the controller 102 will first read the logical-to-physical address table and then perform the host read). Consider, for example, a situation in which the time taken per host read of a 4 kB chuck is GAT sense+host sense. FIG. 10 represents the worst case scenario in which GAT and host reads are always in different plane. This can happen 50% of the time, and interleave can be utilized 50% of the time (i.e., GAT and host reads happen in sequence not utilizing parallelism 50% of the time). Considering this, the number of random read IOPs is 9.5 k.

Figure 11:
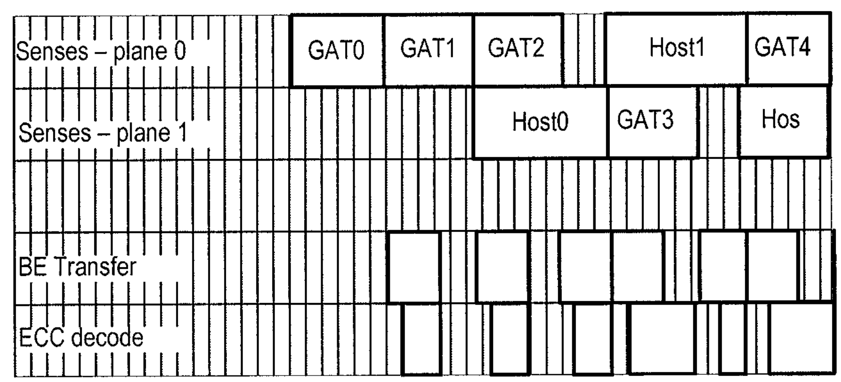
FIG. 11 is a timing diagram of an embodiment in which multiple copies of a logical-to-physical address table are used.

As shown in FIG. 11, in this embodiment, the controller 102 issues interleave read between GAT and host sense by utilizing the two copies of GAT programmed into the two plans of the memory. So, if the host read is to plane 0, the GAT copy is read from plane 1, and vice versa. Thus, the interleave between GAT and host read is always ensured, thereby boosting random read IOPs to 12.5 k. Accordingly, in the example of this embodiment, random read performance is improved by ~25% without increasing the cost of the controller. This can improve user experience with, for example, boot up and application loading.

Figure 12:
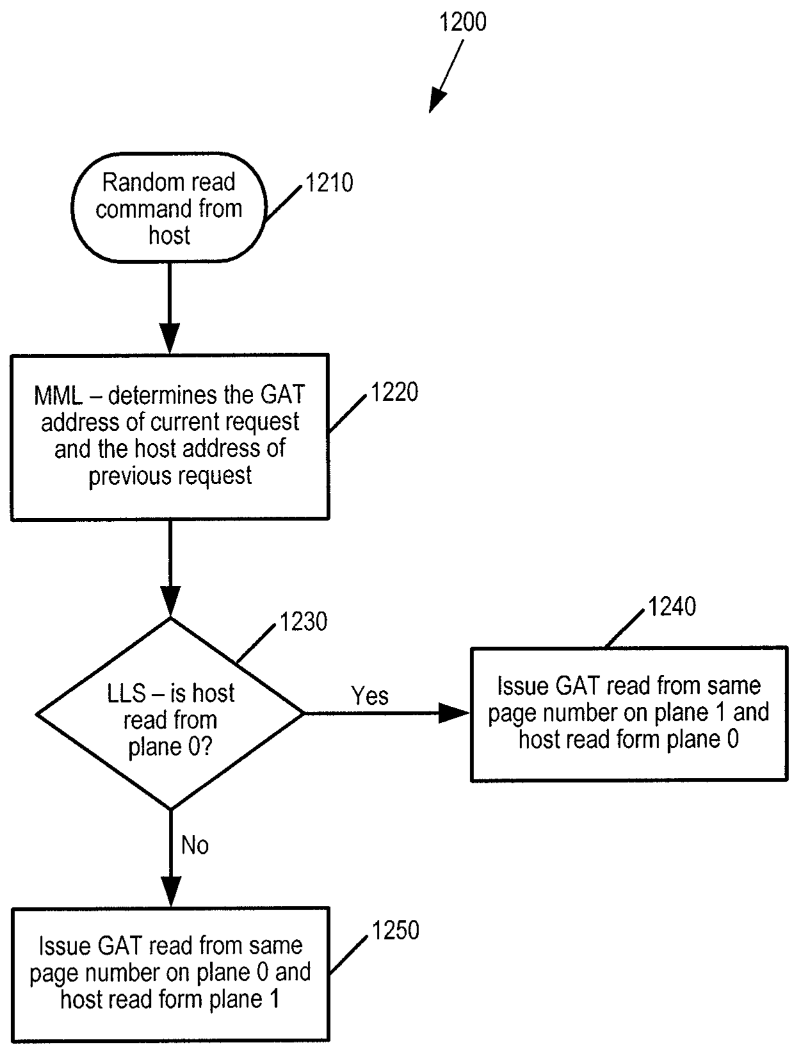
FIG. 12 is a flow chart of a method of an embodiment for dual GAT and read sequences for random read performance improvement.

FIG. 12 is a flow chart 1200 of a method of this embodiment. As shown in FIG. 12, first, the controller 102 receives a random read command from the host (act 1210). The media management layer (MML) in the controller 102 determines the GAT address of the current request and the host address of the previous request (act 1220). The controller 102 then determines if the host read is from plane 0 (act 1230). If it is, the controller 102 issues a GAT read from the same page number on plane 1 and the host read from plane 0 (act 1240). If it isn't, the controller 102 issues a GAT read from the same page number on plane 0 and the host read from plane 1 (act 1250).

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A method for parallelism in a storage system, the method comprising:

performing the following in a storage system comprising a plurality of memory areas accessible in parallel, wherein each memory area stores an identical copy of a logical-to-physical address table:

reading portions of the identical copies of the logical-to-physical address table in parallel from the plurality of memory areas, wherein the portions comprise translations for logical addresses associated with a plurality of memory commands;

translating the logical addresses associated with the plurality of memory commands into physical addresses using the read portions; and performing the plurality of memory commands.

2. The method of claim 1, wherein all of the portions of the logical-to-physical address tables are read before any of the memory commands are performed.

3. The method of claim 1, wherein at least some of the plurality of memory commands are performed in parallel.

4. The method of claim 1, wherein the plurality of memory commands comprise at least one of a read command and a write command.

5. The method of claim 1, wherein at least one of the plurality of memory commands comprises a write command, wherein performing the write command results in a change to one of the logical-to-physical address tables, and wherein the method further comprises marking the logical-to-physical address tables that have not been changed as obsolete.

6. The method of claim 5 further comprising updating the logical-to-physical address tables marked as obsolete per the change made to the one of the logical-to-physical address tables.

7. The method of claim 5, wherein each copy of the logical-to-physical address table is identified by a respective sequence number, wherein the markings as to which logical-to-physical address tables are obsolete are erased during a power loss, and wherein the method further comprises, after the power loss, identifying which logical-to-physical address tables are obsolete based on which logical-to-physical address tables have a sequence number lower than a highest sequence number among all the logical-to-physical address tables.

8. The method of claim 1, wherein the storage system comprises a three-dimensional memory.

9. The method of claim 1, wherein the plurality of memory areas comprise a plurality of memory dies.

10. The method of claim 1, wherein the plurality of memory areas comprise a plurality of planes in a memory die.

11. A method for parallelism in a storage system, the method comprising:

performing the following in a storage system comprising a plurality of memory areas accessible in parallel, wherein each memory area stores an identical copy of a logical-to-physical address table:

identifying a first memory area associated with a first memory operation;

identifying a second memory area from which to read the logical-to-physical address table to translate a logical address associated with a second memory operation; and performing the first memory operation in the first memory area in parallel with reading the logical-to-physical address table from the second memory area.

12. The method of claim 11, wherein the memory operation comprises one of a read command and a write command.

13. The method of claim 11, wherein the plurality of memory areas comprise a plurality of memory dies.

14. The method of claim 11, wherein the plurality of memory areas comprise a plurality of planes in a memory die.

15. The method of claim 11, wherein the storage system comprises a three-dimensional memory.

16. A storage system comprising: a memory comprising a plurality of memory areas accessible in parallel, each memory area storing an identical copy of a table; and at least one of the following:

means for reading the identical copies of the table from the plurality of memory areas in parallel prior to performing a memory operation in one of the plurality of memory areas so that reading the identical copies of the table does not prevent the memory operation from being performed in the one of the plurality of memory areas; and means for determining which memory area to read the identical copy of the table from so that the identical copy of the table is read in parallel with a memory operation being performed in another one of the memory areas.

17. The storage system of claim 16, wherein the table comprises a logical-to-physical address table.

18. The storage system of claim 16, wherein the memory comprises a three-dimensional memory.

19. The storage system of claim 16, wherein the storage system is embedded in a host.

20. The storage system of claim 16, wherein the storage system is removably connectable from a host.

* * * * *